July 13, 1937.    A. C. WOLFF    2,086,788
AUTOMOBILE JACK
Filed May 22, 1935
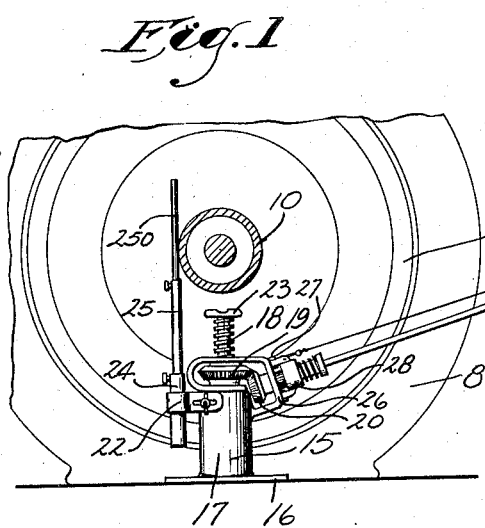
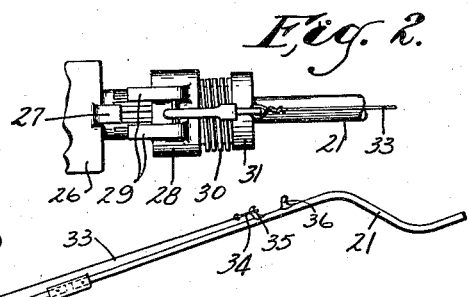
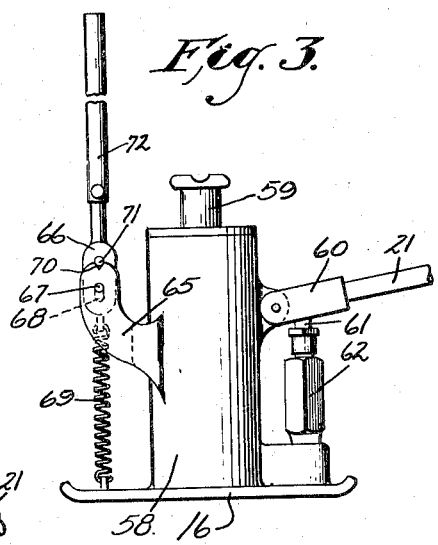
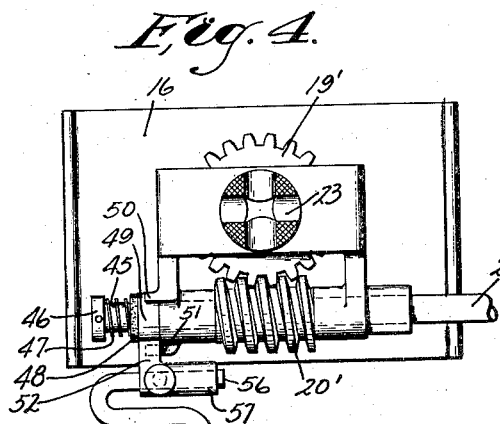
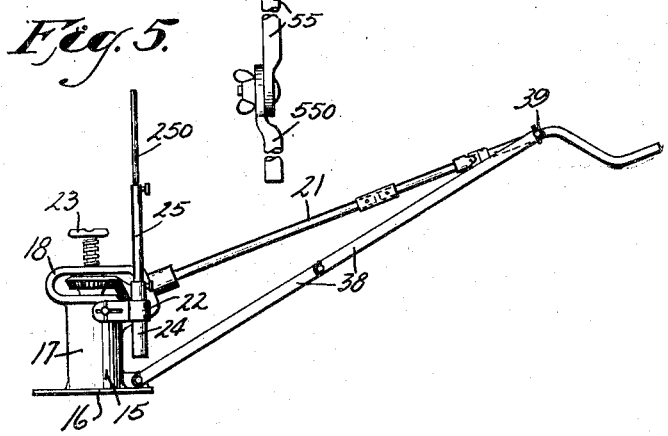
INVENTOR
Arthur C. Wolff
BY Wheler, Wheler and Wheler
ATTORNEYS Patented July 13, 1937

2,086,788

UNITED STATES PATENT OFFICE 2,086,788

AUTOMOBILE JACK

Arthur C. Wolff, Milwaukee, Wis.

Application May 22, 1935, Serial No. 22,743

15 Claims. (Cl. 254—133)

This invention relates to improvements in automobile jacks.

Broadly it is the object of the invention to provide novel and improved means whereby to gauge the position of an automobile jack with reference to the axle.

In modern automobiles the bodies, and particularly the fuel tanks, extend so close to the ground and overhang the axle to such a degree that it is almost impossible for the operator properly to position the jack beneath the axle. If he attempts to do so he will find it necessary to either kneel or lie upon the ground, and even then it is very difficult, at a distance of several feet, to see whether the jack is accurately positioned. By means of the present invention it is possible for the operator to push the jack beneath the car and accurately position it beneath the axle without seeing or attempting to see its position, gauge means registerable between the car and the jack being relied upon through the sense of touch to determine the actual position.

More specifically, it is one of the objects of the invention to provide a gauge means which will be effective between the jack and the axle and yet will not prevent the passage of the jack beneath the overhanging portions of the vehicle such as the fuel tank, which is frequently lower than the axle itself. For this purpose I have disclosed in the accompanying drawing a variety of means whereby the jack may be passed beneath the axle with the gauge approximately horizontal or otherwise lowered, and the gauge may subsequently be erected and used to fix the position of the jack.

Other objects of the invention will appear from the following detailed description.

In the drawing:

Figure 1 is a side elevation of a jack embodying the present invention, this embodiment being so devised that it is applicable as an attachment to existing jacks.

Figure 2 is an enlarged detail view in plan showing a preferred form of connection between the handle and the body of the jack in the apparatus shown in Fig. 1.

Figure 3 is a side elevation showing an embodiment of my gauge invention applied to a hydraulic jack, this preferred form of gauge being, however, applicable to any type of jack.

Figure 4 is a plan view of a further modified embodiment of the invention.

Figure 5 is a side elevation of a further modified embodiment.

Like parts are identified by the same reference characters throughout the several views.

The disclosure of Fig. 1 as to the actual functioning of the gauge is typical of the devices shown in Figs. 3, 4, and 5. The automobile tire 8 carried by wheel 9 mounted on load bearing axle 10, has been punctured and the jack positioned beneath the load bearing axle for the lifting thereof. Except as hereinafter noted, the jack 15 is of conventional design. It comprises a base or shoe 16 sufficiently broad to be slidable along the road surface. Integral with the base 16 is a standard 17 into which is received the jack screw 18. Mounted upon the standard 17 is the usual bevel gear 19, the hub of which constitutes a nut meshing with screw 18 for the elevation and lowering thereof. The gear 19 is driven by pinion 20 with which the generally conventional collapsible jack handle 21 is releasably connected.

The device for centering the jack beneath the axle comprises a gauge, preferably telescopic in form. The supporting clamp 22 is longitudinally adjustable upon the jack standard 17 to determine the spacing between the gauge and the cap 23 of the jack screw. Once this adjustment is obtained for any given axle, it is allowed to remain permanently. Consequently, for a wide variety of axles it is possible to omit this adjustment.

Carried by the clamp 22 is the gauge proper, comprising, in the present device, the tubes 24 and 25 and a rod 250, whereby the gauge is telescopically collapsible for storage and may be extended sufficiently high to assure its engagement with the axle as shown.

It will be obvious that the jack cannot be thrust beneath the axle while the gauge is upright as shown in Fig. 1. In the position shown, the gauge would not even clear the fuel tank at the rear of the vehicle nor the apron at the front. Accordingly means is provided, varying in the various embodiments of my invention, for introducing the jack beneath the axle before the gauge is erected to the position illustrated.

One means of accomplishing the desired result is to provide some sort of handle connection to the body of the jack itself, whereby the jack as a whole may be manipulated either to lie on its side or to stand vertically. The jack may be introduced beneath the car in its horizontal position and may subsequently be erected when all obstacles have been cleared. In the construction shown in Fig. 1 the handle 21 used to operate the pinion 20 may be made to serve the additional function of a handle for the manipulation of the jack as a whole.

To this end I have provided on the frame member 26 which houses pinion 20, one or more clutch teeth such as that shown at 27 in Fig. 2. Splined for axially sliding movement on the handle 21 is a clutch member 28 having complementary teeth at 29 engageable with tooth 27 on the jack body. A compression spring 30 seated against collar 31 on handle 21 tends to urge the clutch member 28 into engagement to lock the handle 21 against rotation with respect to the jack body.

The pressure of spring 30 is, however, subject to the control of a wire or tension line 33 which may have a ring 34 at its end engageable over either of the hooks 35 or 36 on the outer end of the handle. When the ring is engaged over hook 36 the clutch member 28 is retracted as shown in Fig. 2, but when the ring is engaged with hub 35 the clutch member is engageable as shown in Fig. 1. With the clutch member engaged, the handle is used to manipulate the jack body as a whole and to thrust it beneath the car in a horizontal position and erect it to vertical position when all obstructions have been cleared.

When the handle has been thrust full length beneath the car and the jack is then erected, the gauge 250 will be disposed forwardly of the load bearing axle 10, so that when the handle is now pulled to draw the jack rearwardly the gauge will contact the axle and accurately center the jack therebeneath. The ring 34 is now pulled into engagement with hook 36, thereby disengaging the clutch and leaving the handle 21 free to rotate with respect to the jack. The handle may now be used to turn pinion 20 and to raise or lower the jack as desired, and in the usual manner.

In the construction shown in Fig. 5 the gauge clamp 22 and the gauge elements 24, 25, and 250 are identical with those previously described, but they are located rearwardly of the jack to engage the near side rather than the far side of the axle. The clearance on the near side of the axle is comparatively limited on any vehicle and accordingly this construction, while operative, is not preferred.

As a means of turning any jack on its side and raising it to vertical position beneath the car, I have shown in Fig. 5 a different handle arrangement wherein the conventional handle 21 is simply connected by a folding brace 38 with the base 16 of the jack. The brace is non-rotatably clamped at 39 to the handle so that the braced handle constitutes a structure rigid with reference to the body of the jack for the unitary manipulation of the jack in any direction desired. When the jack is positioned the clamp 39 will, of course, be loosened to permit the handle 21 to function for the raising and lowering of the jack in the usual manner.

In the construction shown in Fig. 4 the gauge is automatically raised or lowered by the initial rotation of the handle 21 in the direction to raise or lower the jack respectively. The jack construction is, for purposes of illustration, generally similar to those shown in Figs. 1 and 5, there being a base 16 from which the head 23 is adjustably supported by a conventional jack screw (not shown in Fig. 4). The nut which raises and lowers the jack screw is embodied in a worm gear 19' rotated by a worm 20' with which the handle 21 is connected.

The hub of the worm 20' is extended at 45 and provided with a collar 46 against which the compression spring 47 is seated. This spring acts upon a friction clutch disk 48 bearing against a collar 49 which is rotatable on the shaft between angular positions determined by the stops 50 and 51 with which the gauge bearing arm 52 is engageable. The arm 52 may comprise an integral portion of collar 49.

The gauge rod 55 has a portion 56 longitudinally adjustable in a sleeve 57 at the end of the arm 52, such adjustment providing the initial setting of the gauge. Collapsible upon arm 55 for storage is an extension gauge arm 550. It will be understood that this device may be pushed beneath the car and the axle with the gauge in the horizontal position illustrated in Fig. 4. As soon as the jack has been introduced beneath the car to the proper distance, the operator will turn handle 21 in a clockwise direction as viewed from the right of Fig. 4, thereby tending to raise the jack. The first quarter turn of the screw 20' will frictionally drive the collar 49 through the spring pressed clutch member 48 through a 90 degree angle, so that the gauge will now stand erect in a position determined by the stop 50. In this position the handle 21 may be used to manipulate the whole jack until the gauge strikes the axle in the manner shown in Fig. 1, thereby centering the jack beneath the axle.

When it becomes necessary to lower the axle, the initial quarter turn will frictionally move the collar 49 90 degrees into engagement with stop 51, thereby moving the gauge rod horizontal for withdrawal from beneath the car.

The construction shown in Fig. 3 is one of the simplest and most effective embodiments of the invention and is protected against such damage as might be occasioned by rough handling of the devices shown in the other views. While the gauge of Fig. 3 is shown applied to a hydraulic jack it will be understood that this is merely illustrative.

The usual base 16 carries a hydraulic cylinder 58 in which the jack piston 59 is reciprocable. The handle socket member 60 is pivoted to the cylinder 58 and connected with the pump plunger 61 operating in a pump cylinder 62. The handle 21 may interlock with the socket member 60 in the conventional way to permit the jack to be manipulated forwardly or rearwardly.

On the opposite side of the cylinder 58 from the socket lever 60 is a bracket 65, preferably bifurcated for the support of the gauge arm 66. The two legs of the bifurcated bracket 66 are connected by a pintle bolt 67 which is engaged in a slot 68 of the gauge arm 66. A relatively heavy tension spring 69 connected between the lower end of gauge arm 66 and the base 16 of the jack, serves to hold the gauge arm approximately vertical.

In order to center the gauge arm with comparative rigidity in its vertical position, I notch the top extremities of the bracket legs at 70 and provide the arm 66 with a pin at 71 receivable into the notch 70 when the gauge stands upright. The length of slot 68 is sufficient to permit the whole gauge arm to be raised slightly against the tension of spring 69 to enable the cross pin 71 to leave the notches 70. Obviously, considerable pressure is required to displace the gauge arm from its vertical position, but when it has once been displaced it will fold down as much as required to pass an obstruction. When the obstruction is cleared the gauge arm will again spring to its normal erect position as shown. Its height may be varied if desired, by means of the telescopic extension 72.

One advantage of having the arm yieldable in both directions, consists in the fact that its yieldability not only permits it to be inserted beneath the car, but always spares the gauge from becoming bent by abuse. If the operator jerks rearwardly with too much force after the gauge has cleared the axle, he will not bend the gauge but will merely cause it to become angularly displaced in the other direction. Yet the resistance of the gauge is entirely adequate to enable the jack to be positioned beneath the axle by touch in accordance with the purposes of the present invention.

While the invention may take many forms other than those herein disclosed, I have attempted to select for the purposes of this disclosure, the most practical and the most representative embodiments of the invention.

I claim:

1. The combination with an automobile jack comprising a body and an extensible member, of handle means for controlling the extension of said member, and means for controlling from a remote point the angularly tiltable position of the jack body.

2. An automobile jack comprising the combination with a jack body and an extensible member, of means comprising an elongated handle for adjusting said extensible member respecting said body, and means including connections operable adjacent the end of said handle for securing said handle against rotation with respect to said body, whereby said handle may be used to manipulate said body between a horizontal and vertical position.

3. An automobile jack comprising the combination with a jack body and an extensible member, of means for extending said member comprising a jack handle, and means for manipulating said body comprising a body handle.

4. An automobile jack comprising the combination with a jack body and an extensible member, of means for extending said member comprising a jack handle, and means for manipulating said body comprising a body handle, said jack handle and body handle being connected together near their respective extremities remote from said jack.

5. The combination with an automobile jack comprising a jack body and an extensible member collapsible thereupon, of a gauge projecting from said body beyond the collapsed extent of said member, and means for manipulating said jack including means for erecting said gauge member.

6. The combination with an automobile jack having a base, a body portion and an extensible member collapsible upon said body portion, of means comprising a handle for the extension of said member, a gauge connected with said jack to project beyond said member in the collapsed position thereof, and handle means for manipulating said jack and gauge.

7. The combination with an automobile jack comprising a slidable base, an extension member, and means comprising an elongated handle for adjusting the extension of said member above said base, of a gauge projecting in the direction of extension of said member beyond the extent thereof when collapsed, and means whereby said gauge may swing from its upright position to a position to clear obstructions.

8. The combination with a jack having an extensible member and means for the bodily manipulation of said jack, of a gauge element pivoted to said standard for movement to and from an erect position thereon.

9. In a device of the character described, the combination with a jack comprising a standard and an extensible member, and means for controlling the extension of said member, of a gauge element connected with said standard for pivotal movement to and from an upright position, and means whereby the motion of said extension controlling means is transmitted to said element for the adjustment thereof about its pivotal axis.

10. The combination with a jack comprising a standard, a jack screw, a nut provided with gear teeth, and gear means coacting with the gear teeth of said nut, of a handle connected with said gear means for the rotation thereof, a gauge pivoted to said jack for movement to and from an upright position, and a friction drive from said gear means to said gauge for effecting the angular movement of said gauge according to the direction of rotation of said gear means by said handle.

11. In a device of the character described, the combination with an automobile jack having means for its manipulation, of a gauge pivotally connected with said jack, and means yieldably acting on said gauge in a direction to maintain it normally upright with respect to said jack.

12. In a device of the character described, the combination with a jack having a body portion and an extensible member, of a gauge pivoted to said body portion and normally projecting in the direction of extension of said member, a spring yieldably urging said gauge about its pivotal connection with said body toward the said direction of projection therefrom, and means coacting between said gauge and body impositively to define the normal upright position of said gauge.

13. The combination with a jack having a body portion, of a bracket, a gauge member pivoted to said bracket, said gauge and bracket having complementary interacting means impositively defining an upright position of said gauge, and a spring acting on said gauge in a direction to maintain it yieldable in said position.

14. The combination with a jack having a body portion, of a bracket projecting therefrom and provided with a pintle and a notch, a gauge element loosely fulcrumed on said pintle and provided with means self-centering in said notch, whereby to define a predetermined gauge position, and a spring yieldably acting on said gauge element to urge it toward said position.

15. The combination with a jack comprising a body, of a bifurcated bracket provided with a pintle, a slotted gauge element engaged upon said pintle and yieldable as well as oscillatable thereon, impositive detent means engageable between said gauge element and bracket to restrain said gauge element from oscillatory movement from a predetermined position, said detent means being disengageable upon the lengthwise movement of said gauge element over said pintle, and a spring acting on said gauge element in a direction to maintain said detent means in engagement and yieldably to urge said gauge element toward said position from any displaced oscillatory position thereof upon said pintle.

ARTHUR C. WOLFF.